United States Patent
Jania

[15] 3,648,798
[45] Mar. 14, 1972

[54] SPEED CONTROL SYSTEM FOR AN AUTOMOTIVE VEHICLE

[72] Inventor: Zbigniew J. Jania, 46125 Bloomcrest Drive, Northville, Mich. 48167

[22] Filed: June 2, 1970

[21] Appl. No.: 42,642

[52] U.S. Cl. ........................... 180/105 E, 123/102
[51] Int. Cl. ............................................ B60k 31/00
[58] Field of Search .......................... 180/105–109; 123/102, 103

[56] References Cited

UNITED STATES PATENTS

| | | | |
|---|---|---|---|
| 3,455,411 | 7/1969 | Carp et al. | 180/105 |
| 3,409,102 | 11/1968 | Neapolitakis | 180/109 |
| 3,485,316 | 12/1969 | Slavin et al. | 180/105 |
| 3,447,624 | 6/1969 | Balan et al. | 180/105 |

Primary Examiner—Kenneth H. Betts
Attorney—John R. Faulkner and Keith L. Zerschling

[57] ABSTRACT

An electronic speed control system for an automotive vehicle that is driven by a propulsive means, preferably in the form of an internal combustion engine, the speed of which is controlled by a throttle means. An electrically controlled actuating means is coupled to the throttle means for controlling its position. The speed control system includes means for generating a first signal having a magnitude proportional to vehicle speed, an amplifying means having a high input impedance terminal and a capacitor connected in series with the means for generating this signal and the high input impedance terminal of the amplifying means. Means are also provided for developing a feedback signal having a magnitude that is a function of the position of the throttle means. The amplifying means has a second input terminal connected to this feedback means and an output terminal coupled to control the actuating means. Circuit means are provided, including a switch, that directly conductively couples the output terminal of the amplifying means to the high input impedance terminal, and means are provided for closing this switch when the ignition switch of the vehicle is closed. A set speed switch under the control of the vehicle operator is employed to open this switch when the set speed switch is actuated so that a command speed signal is set across the capacitor and the amplifying means is enabled to combine the first signal, the command speed signal and the feedback signal to supply an actuating signal to the actuating means.

30 Claims, 4 Drawing Figures

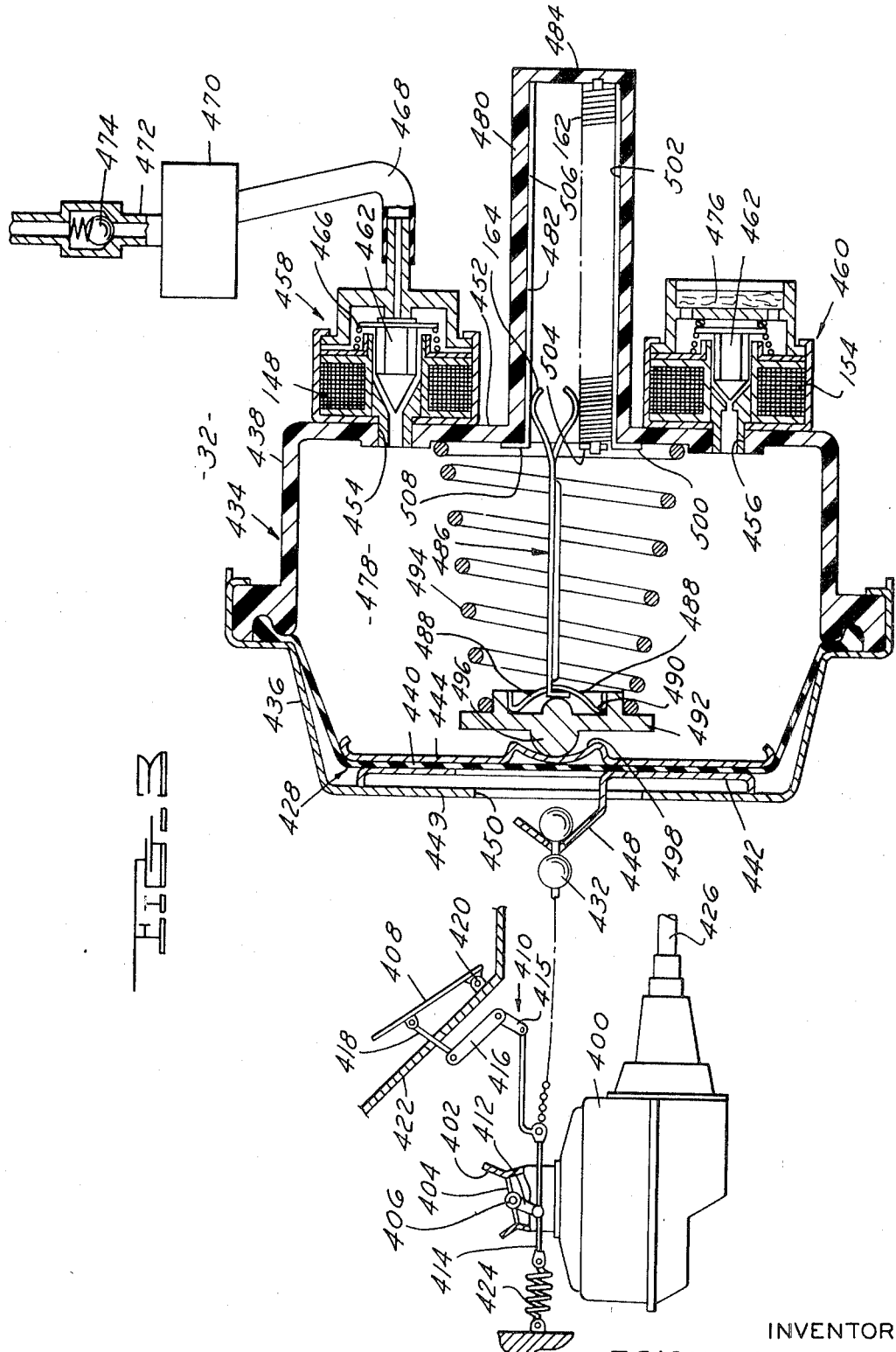

SPEED CONTROL SYSTEM FOR AN AUTOMOTIVE VEHICLE

BACKGROUND OF THE INVENTION

This invention is in the field of speed control systems for automotive vehicles and it relates particularly to an electronic speed control system which has a minimum of moving parts.

Numerous speed control systems have been proposed for automotive vehicles including those of pneumatic type which employ air pressure signals to control the position of the throttle of an internal combustion engine mounted in the vehicle. Other types of speed control systems for automotive vehicles utilize solid state electronic components to provide the signals necessary for the operation of the system. In certain of these systems, the vehicle operator sets a desired speed of operation of the vehicle into the system by varying a variable impedance means, for example, a variable resistor. Means are employed for generating a signal which is a function of the speed of the automotive vehicle, and these two signals are compared to provide an actuating error signal that is applied to a power actuator connected to the throttle of the vehicle. In addition, other systems have been proposed in which an additional signal in the form of a feedback signal proportional to the setting of a throttle is combined with these two signals to provide the actuating signal that is applied to the power actuator.

Certain electronic speed control systems now employed in the industry to control the speed of an automotive vehicle utilize a memory in the form of a capacitor which couples a signal proportional to actual vehicle speed to a high input impedance terminal of a high input impedance amplifier. A command speed signal is stored in the memory by momentarily referring the common terminal between the memory and the high input impedance terminal to a given voltage. The command speed signal is, therefore, derived from and is equal to the instantaneous magnitude of the actual vehicle speed signal. These two signals are combined with a feedback signal proportional to the position of the throttle setting to provide an actuating signal that will actuate an electrically controlled actuator.

The present invention is an improvement over the above described system that provides reliability, improvements in performance and stabilization of the operation of the system over a long period of time.

SUMMARY OF THE INVENTION

The present invention provides an electronic speed control system for an automotive vehicle in which a speed pickup, preferably in the form of a small alternating current generator, is driven at a speed proportional to vehicle speed and produces an output signal having a frequency proportional to vehicle speed. This signal is applied to a frequency to voltage converter which produces an output signal having a magnitude corresponding to the actual speed of the vehicle. This output signal is applied to one terminal of a capacitor which has its other terminal connected to the control electrode of a very high input impedance solid state amplifier, for example, the gate electrode of a field effect transistor whose gate or input impedance may be on the order of $10^{13}$ ohms.

A servo motor or power actuator, preferably in the form of a vacuum motor having an atmosphere valve and a vacuum valve connected to a vacuum supply, is connected to control the position of the controller means or throttle of the internal combustion engine positioned in the automotive vehicle. A throttle position transducer is coupled to the power actuator or servomotor for producing an output signal which is proportional to or is a function of the position of the power output means of the servomotor, for example, the diaphragm in a vacuum motor, and hence is a function of the angular opening of the controller means or throttle. This throttle position transducer produces an output signal which is in essence a feedback signal having an increasing amplitude as the controller or throttle means is moved from its closed or idle position toward its fully open or wide open throttle position. An amplifying means is employed to combine the speed error signal, which is a function of the difference between the actual speed of the vehicle and the desired speed of the vehicle, with this feedback signal from the throttle position transducer thereby producing an actuating error signal. The actuating error signal may be amplified and then applied to operate the power actuator. For example, this actuating error signal may be applied to solenoid windings that operate the atmosphere and vacuum valves of a vacuum motor.

The gate or control electrode of the high input impedance amplifier is connected to the output terminal of the amplifying means through a circuit including a switch. Upon closure of the ignition switch for the automotive vehicle, means are energized for closing this switch thereby conductively coupling the input terminal or control electrode of the high input impedance amplifier to the output of the amplifying means. This essentially disenables the amplifying means and prevents any actuating signal from being developed and applied to the actuating means or the solenoid windings of the vacuum valve and atmosphere valve of the servomotor that controls the throttle of the vehicle.

When the speed of the vehicle is above some certain low predetermined speed, for example, 25 m.p.h. the vehicle operator may set the speed at which he wishes to have the speed control system control the speed of the vehicle by depressing certain switches. This action opens the switch connecting the high input impedance terminal of the high input impedance amplifier and the output terminal of the amplifying means thereby enabling this amplifying means to generate actuating signals. Additionally, at this time, a voltage is trapped or frozen across the capacitor connected in series with the frequency to voltage converter and the high input impedance terminal of the high input impedance amplifying means. This voltage is a command or set speed signal and is a function of the speed of the vehicle just prior to the time this last mentioned switch is opened.

The magnitude of this command or set speed signal is totally unaffected by the operating parameters and changes therein of the electronic components of the speed control system of the present invention. As a result, the above described circuit provides a highly reliable and stable operating system.

Other features of the invention include novel circuit means for accelerating the vehicle and establishing a new higher set or command speed and decelerating the speed of the vehicle and establishing a new or lower set or command speed. Moreover, new and novel circuit means are provided for disabling the speed control system of the present invention when the brakes of the automotive vehicle are applied or other malfunctions in certain of the circuits connected to the speed control system occur.

Thus, the speed control system of the present invention provides an inexpensive, reliable, durable and accurate arrangement for closely controlling the speed of the vehicle. It permits the use of electronic and electrical components having wide tolerances in the values of their parameters, and it furthermore eliminates any need for adjustment or calibration at the time of assembly, since the speed setting operations, involving the disconnection of the high input impedance terminal of the high input impedance amplifier from the output terminal of the amplifying means that provides the actuating signals for the system, is independent of such calibration. This speed setting operation described above also is independent of changes in the parameters of the electronic and electrical components comprising the system due to temperature and aging.

BRIEF DESCRIPTION OF THE DRAWINGS

FIG. 3 is a schematic view of an internal combustion engine which also shows the power actuator or vacuum motor of the speed control system of the present invention in section.

DESCRIPTION OF THE PREFERRED EMBODIMENT

Figure 1:
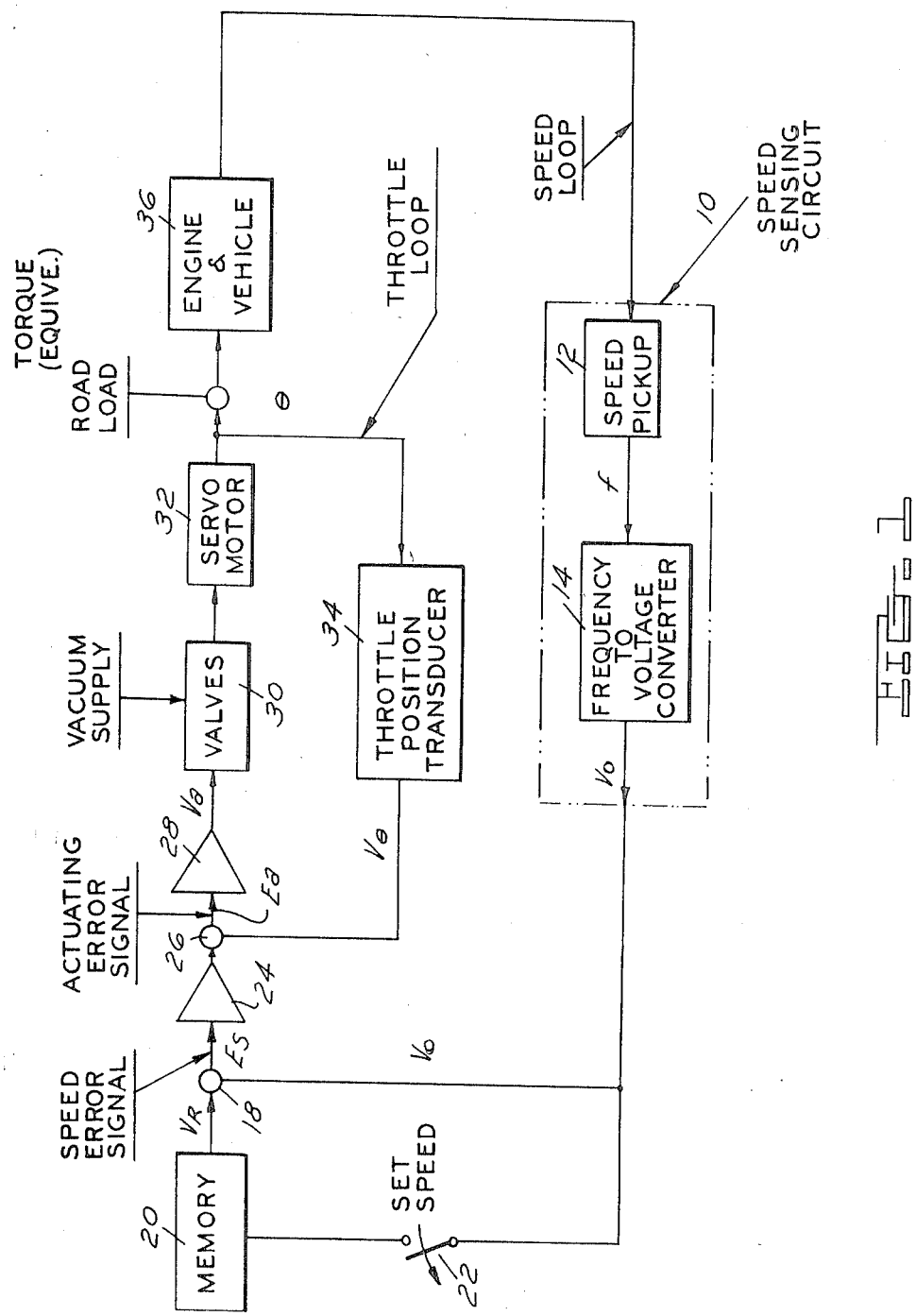
FIG. 1 is a block diagram of the speed control system of the present invention.

Referring now to FIG. 1, there is shown a block diagram of the speed control system of the present invention including a speed sensing circuit 10 comprised of a speed pickup 12 and a frequency to voltage converter 14. The speed pickup 12 may be in the form of a speed sensor that senses the speed of the automotive vehicle in which the speed control system is mounted and produces an output signal having a frequency which is proportional to vehicle speed. This output signal, designated by the letter f, is fed to the frequency to voltage converter 14 which produces an output voltage $V_o$ having a DC level which is a function of the frequency of the signal from the speed pickup 12. The magnitude of the voltage $V_o$ is proportional to the frequency of the signal from the speed pickup 12 and may be a linear function of this frequency.

The voltage $V_o$ is then fed to a comparator 18 which compares the voltage $V_o$, the voltage proportional to the actual speed of the vehicle, with a voltage $V_r$ which corresponds to or is a function of the command, desired or set speed of the vehicle. The voltage $V_r$ is set to a memory 20 via a set speed switch 22 which is connected to receive, through circuits to be described subsequently, a voltage which is a function of the actual speed of the vehicle when the set speed switch is actuated.

The signal $V_r$, that is proportional to or is a function of the command, desired or set speed of the vehicle, is then compared in comparator 18 with the signal $V_o$ which is a function or is proportional to the actual speed of the vehicle to produce a speed error signal $E_s$. The speed error signal $E_s$ is them amplified in an amplifier 24 and applied to a second comparator 26.

The second comparator 26 compares the amplified speed error signal from the amplifier 24 with a feedback voltage V which is a voltage having a DC level proportional to or which is a function of the position of the controller means or throttle of the internal combustion engine in the vehicle. The output from the comparator 26 is an actuating error signal $E_a$ which is amplified in an amplifier 28. This amplified actuating error signal is designated as $V_a$. This amplified actuating error signal $V_a$ is then fed to operate the valves 30 which may comprise an atmosphere valve and a vacuum valve which is connected to a vacuum supply. These valves establish a pressure within a chamber in a servo motor 32 which in turn is connected to the controller means or throttle of the internal combustion engine of the vehicle.

The voltage V which is fed to the comparator 26 to develop the actuating error signal $E_a$, is produced by a throttle position transducer 34 which senses the position of the controller means or throttle and produces an output signal which is proportional to or is a function of the controller or throttle position. This voltage increases as the controller or throttle is moved from a closed or idle position to a wide open or full throttle position. As stated above, the servomotor 32 controls the position of the controller or throttle of the internal combustion engine and, therefore, controls the power output of the engine. The road load of the vehicle then acts on the vehicle and its engine so that the vehicle is driven at some speed which is a function of the power output of the engine. The engine of the vehicle is shown as block 36, as stated previously, a voltage having a frequency which is proportional to the speed of the vehicle.

Thus, in the speed control system of the present invention, there is a major closed feedback loop designated as the SPEED LOOP and a minor closed feedback loop designated as the THROTTLE LOOP.

As will be more specifically explained subsequently, the present invention provides a very reliable, durable and accurate speed control system for controlling the speed of an automotive vehicle in which the actual speed of the vehicle will be controlled to conform within very small limits to a desired set speed of the vehicle. The minor closed feedback system entitled THROTTLE LOOP, although not essential to the provision of an operative speed control system assures a close correlation between the actual speed of the vehicle and the desired speed of the vehicle without undue oscillations and hunting effects.

Figure 2:
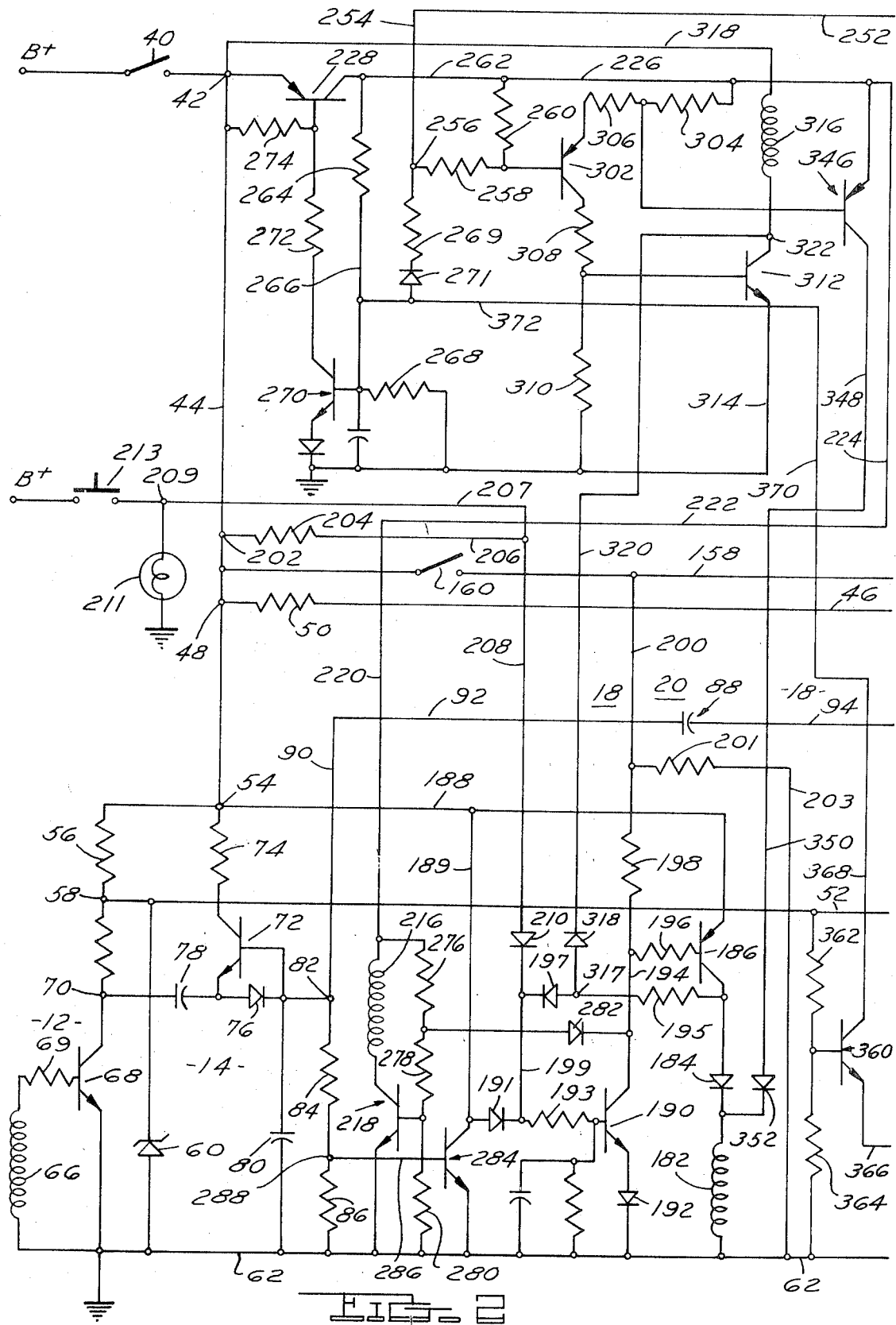
FIGS. 2 and 2a show a complete circuit diagram of the speed control system of the present invention.
Figure 2A:
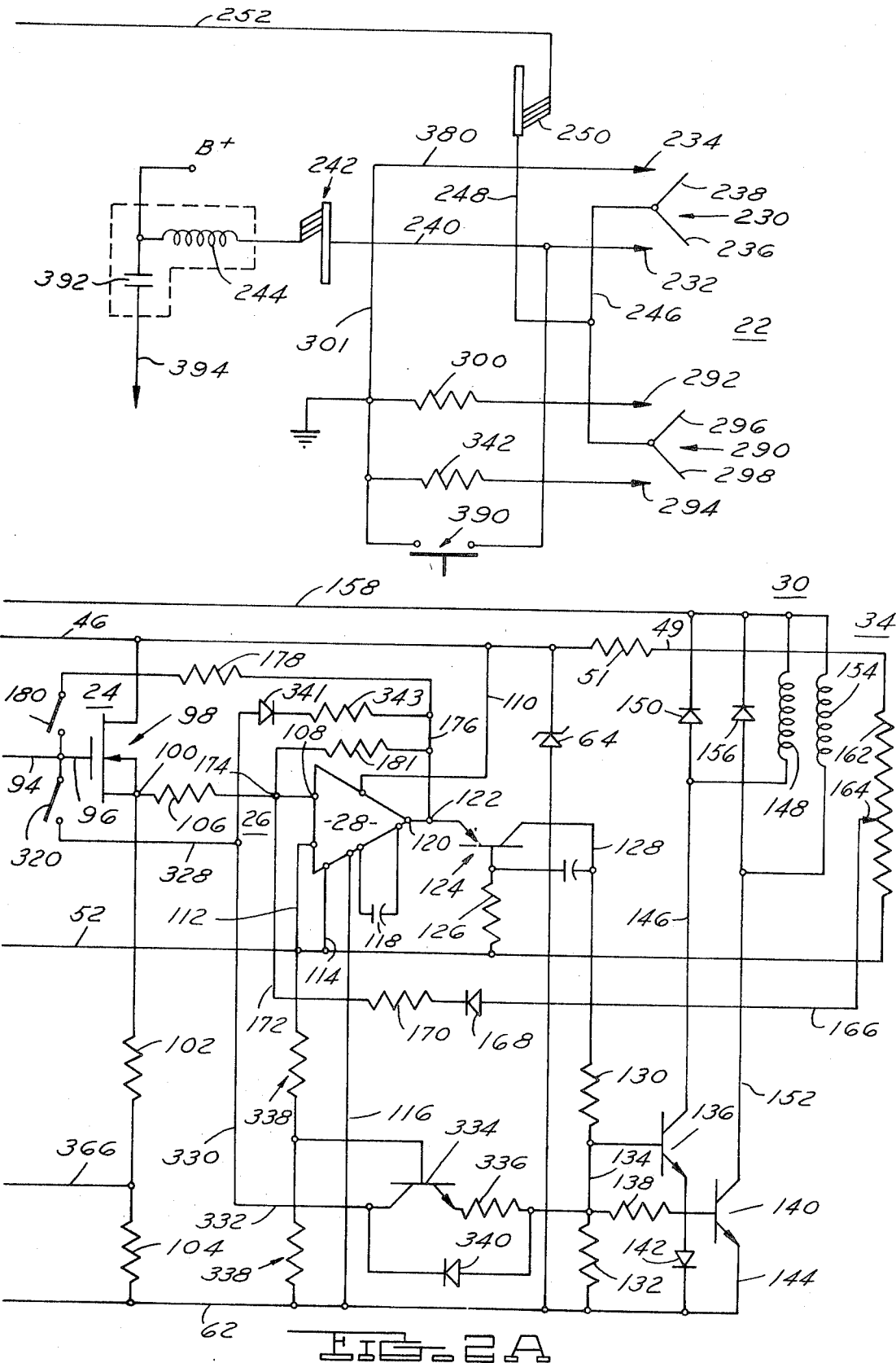

FIGS. 2 and 2a disclose the electronic circuit of the speed control system of the present invention. These two figures disclose the electronic and electrical components making up the speed pickup 12, the frequency to voltage converter 14, the comparator 18, the memory 20, the set speed switch 22, the amplifier 24, the comparator 26, the amplifier 28, the electrically operated portion of the valves 30, and the throttle position transducer 34.

Referring now to FIGS. 2 and 2a, there is shown a source of electrical energy B+ connected to one terminal of ignition switch 40. When the ignition switch 40 is closed, the source of electrical energy is connected to a junction 42, and energization of the junction 42 supplies battery voltage or B+ to the vertical line 44. Line 46 is energized from line 44 via junction 48 and resistor 50 and line 49 is energized from line 46 through resistor 51. Similarly, line 52 is energized from the line 44 via junction 54, resistor 56 and junction 58. A first zener diode 60 is located between line 52 and grounded line 62 to apply a regulated voltage, for example, 4.3 volts, to the line 52, and another zener diode 64 is connected between the line 46 and the grounded line 62 to apply regulated voltage, for example, 9.1 volts, to the line 46 assuming a 12-volt source of electrical energy.

The speed sensor 12 includes an output winding 66 and a rotor (not shown) that is driven by a gear or speedometer cable of the vehicle which rotates at a speed proportional to vehicle speed. As a result, this rotor is driven at a speed proportional to vehicle speed and will induce an alternating current or voltage in the winding 66 having a frequency proportional to vehicle speed. The speed sensor 12 also includes a transistor 68 having its base-emitter circuit connected via the output winding 66 and a resistor 69 so that the base of the transistor 68 receives the alternating current or voltage output of the output winding 66. This switches transistor 68 into a conducting state during the positive half cycles of the output current or voltage from the output winding 66 and a voltage appears at the collector junction 70 during these positive half cycles where it is applied to a frequency to voltage converter 14. This frequency to voltage converter 14 includes a transistor 72 having its collector connected through resistor 74 to the energized junction 54 and having its emitter-base circuit connected by a diode 76. The output pulses from the transistor 68, that have a frequency proportional to vehicle speed, are applied to the transistor 72 and diode 76 via a capacitor 78. The frequency to voltage converter 14 also comprises another capacitor 80.

The output of the frequency to voltage converter 14 appears at a junction 82 across a voltage divider circuit comprised of resistors 84 and 86. The output voltage at the junction 82 varies linearly, or substantially so, with vehicle speed, and hence a first signal is produced at the junction 82 having a magnitude which is substantially proportional to vehicle speed. This signal, at the output of the frequency to voltage converter 14 appearing at the junction 82, is applied to one terminal or side of a memory capacitor 88 through leads 90 and 92. The other terminal or side of the memory capacitor 88 is connected through a lead 94 to the gate electrode 96 of a very high input impedance amplifying means which may take the form of a field effect transistor 98. As will be appreciated from the subsequent description, the memory capacitor 88 forms the memory 20 for the speed control system of the present invention and together with the field effect transistor 98 forms the comparator 18. The field effect transistor also serves as the amplifier 24 shown in FIG. 1.

One output electrode of the field effect transistor 98 is connected directly to the line 46 which, as previously stated, is energized with a regulated voltage. The other output electrode is connected to a junction 100 which in turn is connected to the grounded line 62 through resistors 102 and 104 so that the output voltage of the field effect transistor 98 appears at the junction 100. This output voltage is applied through a resistor 106 to one input terminal 108 of amplifier 28. This amplifier 28 is a standard article of commerce and, for example, may be an RCA operational amplifier CA-3029. The amplifier 28 is energized from the line 46 through lead 110 and is connected to line 52 through leads 112 and 114. One of the terminals is grounded to line 62 via lead 116. Another pair of terminals are intercoupled by a capacitor 118.

The output terminal 120 of the amplifier 28 is connected to a junction 122 which in turn is connected to the emitter of a predriver transistor amplifier 124. The base of the transistor 124 is connected through resistor 126 to the regulated voltage line 52, while the collector thereof is connected through lead 128 to a voltage divider comprised of resistors 130 and 132. A lead 134, connected intermediate the resistors 130 and 132, is connected directly to the base of a transistor amplifier 136 and is connected through resistor 138 to the base of another transistor amplifier 140.

The emitter of transistor amplifier 136 is connected to the grounded line 62 through a diode 142, while the emitter of transistor amplifier 140 is connected to grounded line 62 through a lead 144. The collector circuit of the transistor amplifier 136 is connected through lead 146 with a parallel circuit comprised of a solenoid winding 148 and a transient suppression diode 150. The collector circuit of transistor amplifier 140 is connected through lead 152 with a parallel circuit comprising solenoid winding 154 and transient suppression diode 156. The other terminals of solenoid windings 148 and 154 and transient suppression diodes 150 and 156 are connected to a line 158 which is adapted to be energized from the vertical line 44 through a switch 160, as will be discussed subsequently.

The solenoid windings 148 and 154 control the valves 30 which in turn control the position of the servo motor 32, as can be seen from an examination of FIG. 1. The throttle position transducer 34, shown in FIG. 1, comprises a variable resistor 62 connected between the lines 49 and 52, and this variable resistor includes a wiper arm 164 connected via lead 166, diode 168, resistor 170 and lead 172 to a junction 174. A feedback voltage appears on the wiper arm 164, and hence this voltage, less the voltage drop in diode 168, appears at junction 174 as the feedback voltage V denoted in FIG. 1. This feedback signal V is combined at the junction 174 with the output of the field effect transistor 98 and the combined signal, which is $E_a$ or the actuating error signal denoted in FIG. 1, is applied to the input terminal 108 of the amplifier 28.

The junction 122, which is connected to the output terminal 120 of the amplifier 28, also is connected through lead 176, resistor 178 and switch 180 with the gate or high input impedance terminal 96 of the field effect transistor 98 and to one side of the memory capacitor 88. The resistor 178 is of very low value, for example, approximately 500 ohms, so that when the switch 180 is closed, the output 120 of the amplifier 28 is connected back to the input of the amplifier 24, in the form of field effect transistor 98, by essentially a short circuit arrangement. When the switch 180 is closed, the amplifiers 24 and 28 are essentially in a disabled mode and the gain of these two amplifiers is essentially zero. When the switch 180 is closed, the above conditions prevail, and speed control system of the present invention is inoperative or disabled and will not control the speed of the vehicle.

A resistor 181 is connected between the output terminal 120 and the input terminal 108 of amplifier 28. This resistor is a large feedback resistor which stabilizes the gain of the amplifier 28 and makes it independent of temperature and other changes in the parameters of the amplifier components. It assures that the gain of this amplifier for signals coming from the field effect transistor 98 through resistor 106 is determined by the ratio of the value of resistor 181 to the value of resistor 106 and that gain of signals coming from the variable resistor 162 through the wiper arm 164, lead 166, diode 168, resistor 170 and lead 172 is determined by the ratio of the value of resistor 181 to the value of resistor 170.

The opening and closing of switch 180 is controlled by a solenoid or winding 182 having one end connected to the grounded line 62 and having the other end connected through a diode 184 with the collector of a transistor 186. The emitter of this transistor 186 is connected to a line 188 which in turn is connected to the junction 54. This junction is energized from the source of electrical energy B+ through the closed ignition switch 40, and the vertical line 44.

The conduction of transistor 186 is controlled in part by another transistor 190 which has its emitter connected to the grounded line 62 via a diode 192, its base connected to energized line 188 via lead 189, diode 191 and resistor 193, and its collector connected to the base of transistor 186 via lead 194 and resistor 196. The collector circuit of transistor 186 also is connected into the base circuit of transistor 190 via resistor 195, diode 197 and lead 199 to assure that base current is available to the transistor 190 whenever transistor 186 is in a conducting state.

The collector of transistor 190 is also connected to the line 158 via resistor 198 and lead 200, and the base of transistor 186 is connected to the grounded line 62 via resistors 196, 198, 201 and lead 203. The base of transistor 186 is also connected to line 158 from the junction between resistors 198 and 201 via lead 200. Thus, with switch 160 open, and line 158 unenergized, the transistor 186 will be switched to a conducting state when ignition switch 42 is closed because its emitter is connected to energized line 188 and its base is connected to ground via resistors 196, 198 and 201 and lead 203. Switching of transistor 186 to a conducting state will energize solenoid or winding 182 thereby closing switch 180. This action connects the gate or control electrode 96 of the field effect transistor 98 to the output terminal 120 of amplifier 28 thereby rendering the amplifiers 24 and 28 inoperative and the speed control system of the present invention inoperative.

The base of the transistor 190 is also connected to energized line 44 via junction 202, resistor 204, lead 206, lead 208, diode 210, lead 199 and resistor 193.

The circuit from the line 206 to the junction positioned between the resistor 193 and diode 191, connected in the base circuit of transistor 190, and comprised of lead 208, diode 210 and lead 199 is connected in parallel with a circuit comprised of lead 207, junction 209 and stop lamp 211. The junction 209 is connected to the source of electrical energy B+ through a normally open stop lamp switch 213 that is closed when the brake pedal of the automotive vehicle is depressed. The stop lamp 211 has a very low cold resistance when fed by current through the resistor 204 so that essentially all of the current flowing in line 206 flows through line 207, junction 209 and stop lamp 211 to ground. This current is insufficient to energize the stop lamp 211, and hence its resistance remains at a very low level.

As explained previously, the line 158, which supplies power to the solenoids 148 and 154 of the valves 30 of the servo motor 32, is connected to the line 44 through the switch 160. Thus, when the switch 160 is closed, power is supplied to the line 158 through the line 44, junction 42 and closed ignition switch 40. A solenoid or winding 216, that is connected in series with the collector-emitter circuit of a transistor 218, controls the opening and closing of the switch 160. When the winding 216 is energized, the switch 160 will close, and when the winding 216 is deenergized, the switch will open. In order that the winding 216 be energized, it is necessary that electrical power be supplied to it and it is also necessary that the transistor 218 be in a conducting state.

It can be appreciated that the end of the solenoid or winding 216 opposite the transistor 218 is connected through lines 220, 222 and 224 to a line 226. When the ignition switch 40 is closed and nothing else has occurred, this line 226 is not energized since the transistor 228, having its emitter connected to the junction 42 and its collector connected to the line 226, is in a nonconducting state. Therefore, in order for the winding 216 to be energized, it is necessary that transistor 228 be switched to a conducting state.

Switching of transistor 228 to a conducting state is accomplished by means of a push button type, on-off rocker switch 230 that may conveniently be positioned on he steering wheel of the automotive vehicle and is spring biased to the open position shown. This rocker switch has an "ON" terminal 232 and an "OFF" terminal 234, as well as, conductive blades 236 and 238 which are adapted to engage the "ON" terminal 232 and the "OFF" terminal 234, respectively. The "ON" terminal 232 is connected via lead 240, a steering wheel slip ring and brush assembly 242 and a horn relay winding 244 to the source of electrical energy B+. Depression of the conductive blade 236 into engagement with the "ON" terminal 232 thereby supplies positive electrical energy via the circuit previously described to lead 246 connected to both the conductive blades 236 and 238. This positive potential is applied through lead 248, a second slip ring and brush assembly 250, lead 252 and lead 254 to a junction 256. Electrical energy then flows through resistor 258, resistor 260, line 262 (which is a portion of line 226), resistor 264, line 266 and resistor 268 to ground. This action provides sufficient bias on the base of a transistor 270 to switch this transistor into a conducting state. A resistor 269 and a blocking diode 271 are connected between junction 256 and line 266 to prevent direct application of the positive potential of junction 256 to line 266.

Switching of the transistor 270 into a conducting state provides a path for base current out of the base of transistor 228 via resistor 272. This action switches transistor 228 to a conducting state thereby energizing the line 226. A base biasing resistor 274 is connected between the base and emitter of transistor 228. When the transistor 228 is switched to a conducting state and the vehicle operator removes his finger or hand from the blade 236 of the on-off switch 230, this blade will come out of contact with the "ON" terminal 232 thereby removing the positive potential from the junction 256. However, the transistors 228 and 270 will be latched into their conductive states since current may flow from the collector or transistor 228 through resistor 264 and resistor 268 to provide base bias on the transistor 270 thereby keeping it in a conducting state, and with the base biasing resistor 274 in the emitter base circuit of transistor 228, the conduction of transistor 270 will assure that transistor 228 remains in the conductive state.

Conduction of transistor 228 energizes line 226 from the source of electrical energy B+, and the upper end of winding or solenoid 216, that controls the operation of switch 160, will be energized from the line 226 via leads 224, 222 and 220. A voltage divider, comprised of resistors 276, 278 and 280, is connected across the series circuit comprised of the solenoid or winding 216 and the transistor 218. A diode 282 is connected to conduct current from the junction between resistors 276 and 278 into the collector circuit of transistor 190 thereby energizing the collector of transistor 190. This will switch transistor 190 to a conducting state since its base is energized from line 188 via lead 189, diode 191 and resistor 193. Hence, there is a low impedance path for current from the junction of resistors 276 and 278 through diode 282 and the collector-emitter circuit of transistor 190. As a result, sufficient current does not flow through resistors 278 and 280 to bring transistor 218 into a conducting state and winding 216 remains unenergized thereby keeping switch 160 in the open position. Thus, with the ignition switch 40 closed and the "ON" switch momentarily depressed, i.e., the blade 236 momentarily brought into contact with the "ON" terminal 232 of the "ON" switch 230, the winding 216 will still remain unenergized and the switch 160 will remain open.

A low speed inhibit means in the form of a transistor 284 is provided. This transistor has its emitter circuit connected to ground via grounded line 62 and its collector connected to a junction between the diode 191 in the base circuit of transistor 190 and the lead 189 which is connected to the energized line 188. The base of this transistor 284 is connected through lead 286 to a junction 288 positioned between resistors 84 and 86. As stated above, the output from the frequency to voltage converter 14 is applied across resistors 84 and 86. As a result, the voltage appearing at the junction 288 is a function of and is proportional to the voltage appearing at the junction 82 which, as stated previously, has a magnitude which is substantially proportional to vehicle speed. A certain threshold voltage must be available at the junction 288 in order to switch transistor 284 into a conducting state and this may be selected to correspond to some predetermined vehicle speed, for example, 25 m.p.h. When this speed is reached, the transistor 284 is switched to a conducting state thereby providing a very low impedance path for current from line 188 through line 189 and transistor 284 to ground. This action removes almost completely the current previously flowing into the base of transistor 190 through diode 191 and resistor 193 thereby readying or enabling transistor 190 to receive command signals at its base, as will now be described. However, the base of transistor 190 receives collector current from conducting transistor 186 via resistor 195, diode 197, lead 199 and resistor 193. Consequently, transistor 190 remains latched in its conducting state.

The set speed switch 22 may comprise a rocker type, push button switch 290 having an accelerate set terminal 292 and a coast set terminal 294. This switch is mounted in the automotive vehicle and may be conveniently mounted on the steering wheel of the vehicle opposite the on-off switch 230. It includes a first conductive blade 296 adapted to contact the accelerate set terminal 292 and a second blade 298 adapted to contact the coast set terminal 294. Each of the blades 296 and 298 is connected through a junction to the lead 246 which is also connected to the junction of the conductive blades 236 and 238 of on-off switch 230. Momentary depression of the conductive blade 296 into contact with the accelerate set terminal connects the blade 296, and hence the lead 246, to ground through a resistor 300 and grounded line 301. This action connects the junction 256 to ground through leads 254, 252, the brush and slip ring assembly 250, lead 248, lead 246, blade 296, terminal 292 and resistor 300 thereby connecting the base of a transistor 302 to ground through resistor 258, junction 256, and the circuit just described above. This provides a path for base current out of transistor 302, and the emitter circuit, which is connected to line 226 via resistors 304 and 306, will conduct current into the base circuit. As a result, transistor 302 is switched to a conducting state and current will flow to ground from its collector through a voltage divider comprised of resistors 308 and 310 thereby raising the potential of the junction located between these two resistors above ground. This action provides a base bias on and base current into the base of transistor 312. The emitter of transistor 312 is connected directly to ground through lead 314, while the collector thereof is connected to the junction 42, and hence the source of electrical energy B+, through a solenoid or winding 316 and a lead 318. As a result, transistor 312 is switched to a conducting state thereby energizing the winding 316 which controls a switch 320 connected to the gate or control electrode 96 of the field effect transistor amplifier 98. At this time, this switch 320 will close for purposes which will be described subsequently.

The junction 317, located between the resistor 195 and diode 197 in the collector circuit 186, is now connected to ground through diode 318, lead 320, junction 322 and conducting transistor 312. It can be seen that this path to ground is a very low impedance path and it diverts collector current of transistor 186 from the base of transistor 190. If it is assumed that the speed of the vehicle is above the low speed inhibit level so that transistor 284 is in a conducting state, the current into the base of transistor 190 is reduced to a level where transistor 190 is switched to a nonconducting state.

Switching of transistor 190 to a nonconducting state raises the potential at the collector electrode thereby backbiasing diode 282 and preventing current flow through it since there is no path through the nonconducting transistor 190. As a result, current from line 220 flows in sufficient quantity through resistors 276, 278 and 280 to ground to raise the base of transistor 218 to a level where current will flow through the base and into the emitter circuit. This switches transistor 218 to a conducting state thereby energizing the solenoid or winding 216. This action closes switch 160 thereby energizing the line 158 and the solenoids 148 and 154 of valves 30.

With line 158 energized from the source of electrical energy B+, a positive potential is applied to the base of transistor 186 thereby cutting off base current. This action switches transistor 186 to a nonconducting state since there is no longer any path for the base current of this transistor through resistors 198, 201 and lead 203 or through nonconducting transistor 190. As a result, winding 182, connected in the collector circuit of transistor 186, is deenergized thereby opening switch 180 and disconnecting the gate or control electrode 96 of the field effect transistor 98 from the output terminal 120 of amplifier 28 thereby enabling these two amplifiers to operate properly.

As previously stated, switching of transistor 312 to a conducting state, when the accelerate set terminal 292 of set speed switch 290 is connected to ground through resistor 300 by the engagement of blade 296 with this terminal, energizes winding 316 thereby closing switch 320 that is connected to the control or gate electrode 96 of the field effect transistor 98. The stationary contact or terminal of switch 320 is connected through leads 328, 330 and 332 to the collector of transistor 334. The emitter of transistor 334 is connected to the upper end of resistor 132 through a resistor 336 and the base of this transistor is connected to a voltage divider 338 connected between energized line 52 and grounded line 62. A diode 340 is connected across the emitter-collector circuit of transistor 334 and the resistor 336. This particular connection of the transistor 334 provides a constant current path from the gate or control electrode 96 of the field effect transistor 98 through closed switch 320, line 328, line 330, line 332, the emitter-collector circuit of transistor 334, resistor 336 and resistor 132 to grounded line 62, thus lowering the potential on the gate or control electrode 96 of the field effect transistor 98 at a constant rate. The stationary terminal of switch 320 is also connected to the output terminal 120 of amplifying means 28 via lead 328, diode 341 and resistor 343 for purposes that will be described subsequently.

When the vehicle operator releases the speed set switch 290 so that the conductive blade 296 comes out of contact with the accelerate set terminal 292, transistor 302 is switched to a nonconducting state since there is no longer a path for base current through it. When transistor 302 is switched to a nonconducting state, transistor 312 is also switched to a nonconducting state thereby deenergizing the winding 316 and opening the switch 320. At this time, any potential appearing across the memory capacitor 88 is frozen or trapped since the switches 180 and 320 connected to the gate or control electrode 96 of the field effect transistor 98 are open, and the input impedance of the control or gate electrode 96 is very high, for example, on the order of $10^{13}$ ohms. At this time also, transistors 186 and 190 will be latched in their nonconducting states thereby keeping the winding 182 deenergized and the switch 180 open. The solenoid or winding 216 will be energized through the conduction of transistor 216 thereby keeping the switch 160, that supplies power to the line 158, closed.

As was previously stated, the memory capacitor 88 has impressed on the left hand terminal or plate, as viewed in FIG. 2, a voltage or potential from the junction 82 via lead 90. This voltage is a first signal which is derived from the output of the frequency to voltage converter 14 and is proportional to the speed of the vehicle. On the other hand, the other terminal of the memory capacitor 88 was coupled to the output terminal 120 of amplifier 28 when the switch 180 was closed. When this switch is opened, therefore, a potential is frozen or trapped across capacitor 88 that is a function of the speed of the automotive vehicle at the time the switch 180 is opened and this signal is the command speed signal for operating the vehicle at the speed at which the vehicle is traveling when the switch 180 is opened. Moreover, it can be appreciated that the switch 320 will remain closed until the vehicle operator releases the speed set switch. If he does any more than tap this switch so it momentarily closes and opens, i.e., holds it in the closed position, voltage will drain from the gate or control electrode 96 of the field effect transistor 98 as long as he holds the set speed switch closed. This voltage drains through the closed switch 320 and the constant current transistor 334. This action, as will be explained subsequently, will cause an acceleration of the vehicle. When, however, the vehicle operator releases the speed set switch 290, the switch 320 will open and a voltage will be frozen across the memory capacitor 88 which will operate the speed control system, as will be explained subsequently, at the speed prevailing at the time the speed set switch 290 is released.

The speed control system of the present invention may also be enabled or set into operation by the actuation of the speed set switch 290 so that the conductive blade 298 comes into contact with the coast set terminal 294. This operation connects the conductive blade 298 to ground through the coast set terminal 294 and a resistor 342 which has a value substantially below that of the resistor 300. For example, resistor 342 may have a value of approximately one-fifth to one-sixth the value of the resistance of the resistor 300. As a result, the junction 256 is connected to ground through lead 254, lead 252, the slip ring and brush assembly 250, lead 248, lead 246, conductive blade 298, coast set terminal 294 and the low valued resistor 342. This action will switch transistor 302 into a conducting state and will also switch transistor 312 into a conducting state. Switching of transistor 312 to the conducting state switches transistor 190 to a nonconducting state, as previously described, thereby switching transistor 218 to a conducting state and energizing solenoid or winding 216 which controls the closure of switch 160. This action energizes the line 158 thereby energizing solenoid windings 148 and 154 of the valves 30 and thereby switching transistor 186 to a nonconducting state.

It can be appreciated that, since the base of transistor 302 is connected to ground through the low valued resistor 342 which is approximately one-fifth or one-sixth of the resistance of resistor 300, the transistor 302 will be driven to a far larger or greater conducting state that it was when the conductive blade 296 was positioned in contact with the accelerate set terminal 292. Sufficient current flows through the voltage divider comprised of resistors 304 and 306 positioned in the emitter circuit of transistor 302 to provide sufficient base bias on the base of transistor 346 to switch it to a conducting state. It can be appreciated that the emitter of this transistor is connected to the energized line 226 and that emitter-base current will flow from this line through the emitter, through the base, through resistor 306 and into the emitter of conducting transistor 302. The collector of transistor 346 is connected via leads 348, 350 and a diode 352 to the upper terminal of the solenoid or winding 182 that controls the action of the switch 180 that connects the gate or control electrode 96 of field effect transistor 98 to the output electrode 120 of the amplifier 28. Therefore, the winding 182 will be energized and the switch 180 will be closed thereby disenabling the amplifier 24, comprised of field effect transistor 98 and amplifier 28, until the conductive blade 298 comes out of contact with the coast set terminal 294.

When the vehicle operator releases the speed set switch 290 so that the conductive blade 298 comes out of contact with the coast set terminal 294, the action described above with respect to the setting of the speed control system by virtue of the closing of the accelerate switch takes place, that is, the winding 316 is deenergized by virtue of transistor 312 being switched to a nonconducting state thereby opening switch 320. Solenoid winding 216 remains energized thereby keeping switch 160 closed, and transistor 326 in addition is switched to its nonconducting state thereby moving the path of current through this conducting transistor, lead 348, lead 350, diode 352 and solenoid or winding 182. Deenergization of winding 182 opens switch 180 thereby trapping a voltage across the memory capacitor 88 which is a command signal corresponding to the speed at which the vehicle operator releases the speed set switch 290 and conductive blade 298 comes out of contact with the coast set terminal 294.

A redundant brake or large speed error inhibit amplifier in the form of transistor 360 is provided. This transistor has its base connected to a junction between resistors 362 and 364 that are connected in series between the energized line 52 and the grounded line 62. The emitter of this transistor 360 is connected through lead 366 to the junction of resistors 102 and 104 which are connected in series between the output electrode of the field effect transistor 98 at junction 100 and the grounded line 62. The collector of transistor 360 is connected through leads 368, 370 and 372 to the lead 266 positioned between resistors 264 and 268.

The vehicle operator may deenergize the speed control system of the present invention by moving the conductive blade 238 of on-off switch 230 into contact with the "OFF" terminal 234. This action connects the base of transistor 270 and the lead 266 positioned between resistors 264 and 268 to ground through diode 271, resistor 269, junction 256, lead 254, lead 252, the brush and slip ring assembly 250, lead 248, lead 246, conductive blade 238, "OFF" terminal 234, lead 380 and grounded line 301. This action diverts the current flowing previously through resistor 264 into the base of 270 from the base through this circuit thereby switching transistor 270 to a nonconducting state. Switching of transistor 270 to a nonconducting state switches transistor 228 to a nonconducting state thereby deenergizing line 226 and removing the source of energy supplied through leads 224, 222 and 220 to the solenoid or winding 216 and to the transistor 218.

Deenergization of the winding 216 opens switch 160 thereby deenergizing the solenoid windings 148 and 154 of the valve 30. Opening of the switch 160 also removes the positive potential on line 200 that is connected to line 158. Consequently, base current may flow out of the base of transistor 186 through resistors 196, 198, 201 and lead 203 to ground. This switches transistor 186 to a conducting state thereby energizing the winding 182. The energization of the winding 182 closes the switch 180 connected between the gate or control electrode 96 of the field effect transistor 98 and the output electrode 120 of the amplifier 28 thereby disenabling the amplifying system from controlling the speed of the vehicle.

As previously stated, the line 40, shown in FIG. 2a, is energized from the source of energy B+ through horn relay winding 244 and slip ring assembly 242 positioned on the steering wheel of the automotive vehicle. A horn button 390 may be depressed to energize the horn relay from the source of electrical energy. This action grounds lead 240 thereby causing current flow through relay winding 244 and closing contacts 392 that connect the source of electrical energy B+ to a lead 394 that in turn is connected to the vehicle horn.

Referring now to FIG. 3, there is shown an internal combustion engine 400 having an air intake means 402 which may be part of a carburetor mounted on the internal combustion engine 400. The carburetor has a movable controllers means 404 which may be in the form of a carburetor throttle plate pivotally mounted for rotation about a pivot 406. The controller means or throttle plate 404 may be conventionally connected to an accelerator pedal 408 through a conventional linkage system 410 comprising arm 412, link 414, link 415, link 416 and link 418. The accelerator pedal may be pivotally mounted at 420 to the floor board 422 of the vehicle.

The controller means or throttle plate 404 is biased to its closed position by means of a tension spring 424 having one end thereof affixed to link 414. When the accelerator pedal 408 is depressed, the controller means or throttle plate 404 will be rotated counterclockwise, as shown in FIG. 3, towards its open position through the linkage means 410 to provide more fuel-air mixture for the internal combustion engine 400 and thus increasing its speed. A drive shaft 426 from the internal combustion engine 400 may be connected to the driving wheels of the automotive vehicle through a conventional transmission and driveline. The link 414 and hence the controller means 404 or carburetor throttle are also connected to a diaphragm 428 of the servo motor, in the form of a vacuum motor or power actuator 32, through a suitable chain type connector 432.

As more fully described in copending application Ser. No. 781,170, filed Dec. 4, 1968, now U.S. Pat. No. 3,572,214 in the name of Gary F. Woodward and assigned to the assignee of the present invention, the servo or vacuum motor 32 comprises a housing 434 having a first cup-shaped portion 436 and a second cup-shaped portion 438 constructed of a plastic insulating material. The diaphragm 428 is constructed of a flexible elastomeric material and has its outer periphery trapped or fixed between the flanges formed on the cup-shaped portions 436 and 438 of the housing 434. The main body portion 440 of the diaphragm 428 is positioned between an outer metallic plate 442 and inner metallic plate 444 by a plurality of rivets not shown. The outer metallic plate 442 includes a hook member 448 that receives the other end of the chain type connector 432.

The cup-shaped portion 436 of the housing includes an end wall 449 having a central aperture 450 positioned therein so that atmospheric pressure may be applied to the side of the diaphragm 428 that is positioned against the outer plate 442.

The other cup-shaped portion 438 has an end wall 452 positioned in generally spaced parallel relationship with respect to the end wall 449. This end wall 452 has a pair of spaced threaded bores 454 and 456 that receive a normally closed vacuum valve 458 and a normally open atmospheric valve 460. These two valves are conventional in construction and each includes a ferromagnetic shuttle or valve member 462, each of which is controlled by a solenoid or winding. The solenoid or winding for the vacuum valve 458 is the solenoid or winding 148 shown in FIG. 2a which is connected to be energized by the transistor amplifier 136. The solenoid or winding for the atmosphere valve 460 is the solenoid or winding 154 shown in FIG. 2a which is connected to be energized by the transistor amplifier 140.

The shuttle or valve member 462 of the vacuum valve 458 is spring biased by a spring 466 to cover the end of conduit 468. The valve member or shuttle 462 is fluted so that fluid may flow through the valve when winding is actuated sufficiently to move valve member or shuttle 462 to the left, as shown in FIG. 3, to uncover the conduit 468. Conduit 468 is connected to a vacuum accumulator or supply 470 which is denoted in the block diagram of FIG. 1 by the words "VACUUM SUPPLY." The vacuum accumulator or supply 470 may be suitably connected through a conduit 472 and a check valve 474 to the intake manifold of the internal combustion engine 400.

On the other hand, the atmospheric valve 460 is in a normally open position, as shown, so that atmospheric pressure may force air through a filter 476 into chamber 478 that is formed by the cup-shaped portion 438 of the housing 434 and the diaphragm 428.

The end wall 452 of the cup-shaped portion 438 of the housing 434 has a protuberance 480 communicating with the chamber 478 and essentially forming a part of it. This protuberance 480 has an axially extending opening 482 positioned therein and a closing end wall 484.

A movable means 486 in the form of movable wiper arm 164 of variable resistor 162 is affixed to a plate 488 positioned in an annular recess 490 of a support 492 for a helical compression spring 494. This support 492 has a lower protuberance 496 bearing on a complementary indentation 498 positioned in inner plate 444. The other end of the helical compression spring 494 bears against the end wall 452 of the housing member 438.

The lead 49, shown in FIG. 2a, is connected at 500 to one end of a conductive bar 502 positioned in the axially extending opening 482 in the protuberance 480, and the other end of the conductive bar 502 is connected to the resistor 162 also positioned in the axially extending opening 482 of protuberance 480. The other end of the resistor 462 is connected at 504 to the line 52 shown in FIGS. 2 and 2a. The wiper arm 164 is in engagement with the resistor 162 and also with another conductive bar 506 positioned in the bore 482 opposite the conductive bar 502 and resistor 162. This conductive bar 506 is connected to lead 166, shown in FIG. 2a, at 508.

OPERATION

As brought out above, closure of the ignition switch 40 by the vehicle operator will energize lines 46, 52 and 188 of the system. Energization of line 188 will switch transistor 186 to a conducting state thereby energizing the winding 182 and closing switch 180. Closure of switch 180 will connect the gate or control electrode 96 of the field effect transistor 98 to the output terminal 120 of amplifier 29 to disenable the amplifying system comprised of amplifiers 24 and 28. At this time, the switch 160 is open since solenoid or winding 216 is not energized. Therefore, the line 158, connected to the solenoid windings 148 and 154 of the vacuum valve and atmosphere valve 458 and 460, respectively, will not be energized. As a result, the vacuum motor, shown in FIG. 3, will be in the position shown since atmospheric pressure exists in the chamber 478. The chain type connector 432 will, therefore, be in a loose position and the speed of the internal combustion engine 400 and the vehicle will be under the control of the accelerator pedal 408.

The vehicle operator must then depress momentarily the on-off switch 230 so that the conductive blade 238 comes into contact with the "ON" terminal 234. This action, as brought out above, latches transistors 228 and 270 into their conducting states thereby energizing line 226 and through line 226, the emitters of transistors 302 and 346 and supplying power to the upper end of solenoid 216.

A voltage or current having a frequency proportional to vehicle speed will be generated by the speed sensor 12 and this alternating current or voltage will be converted to a direct current or voltage at the junction 82 by the frequency to voltage converter 14. This direct current or voltage is applied through leads 90 and 92 to the left hand side of the memory capacitor 88. A fraction of this voltage will appear at the junction 288 which is connected to the base of the low speed inhibit amplifier 284. If the vehicle is traveling above this low speed inhibit level, for example, 25 m.p.h., the low speed inhibit amplifier 284 will be switched to a conducting state thereby readying the speed control system for response to the actuation of the speed set switch 290.

Assuming that the brake pedal of the vehicle is not depressed so that stop lamp switch 213 is open, the vehicle operator may set the speed of the vehicle, i.e., the speed at which he wishes the system of the present invention to control the speed of the vehicle by momentary actuation of the set speed switch 290. He may bring the conductive blade 296 into contact with the accelerate set terminal 292 thereby switching transistors 302 and 312 into their conducting states. Switching of transistor 312 to its conducting state energizes the solenoid or winding 316 thereby closing switch 320. This action also grounds the junction 317 connected to the collector of transistor 186 via resistor 195. This action diverts the current previously flowing from the collector of transistor 186 into the base of transistor 190 to ground through diode 318, lead 320, junction 322 and conducting transistor 312 thereby switching transistor 190 to a nonconducting state.

Switching of transistor 190 to a nonconducting state permits current to flow through resistor 278 and resistor 280 connected to the base of transistor 218 thereby providing sufficient base to emitter bias on this transistor to switch it to a conducting state thus energizing winding or solenoid 216 and closing switch 160 to energize line 158. The energization of the line 158 applies a positive potential through line 200 to the junction of resistors 198 and 201 thereby cutting off base current flow to ground out of the base of transistor 186 through resistor 198, resistor 201 and lead 203. This causes transistor 186 to be switched to a nonconducting state thereby deenergizing solenoid or winding 182 and opening switch 180.

Closing of the switch 160 also supplies power to the solenoid windings 148 and 154 of the vacuum valve 458 and to the atmosphere valve 460. When the vehicle operator releases the speed set switch 290 so that the conductive blade 296 comes out of contact with the accelerate set terminal 292, the transistors 302 and 312 are switched to their nonconducting state, winding 316 is deenergized and switch 320 is opened thereby creating a complete open circuit for the right hand side of capacitor 88 and trapping a voltage across it which is the command speed signal and which is a function of the signal produced at the junction 82 from the speed sensor 12 via the frequency to voltage converter 14.

As previously stated, the vehicle operator may also set the speed of the vehicle by engaging conductive blade 298 of the speed set switch 290 with coast set terminal 294. The circuits described above will respond in the same way except the transistor 346 will be switched to a conducting state which energizes winding 182 via lead 348, lead 350 and diode 352. As a result, winding 182 will remain energized thereby keeping switch 180 closed and keeping the gate or control electrode 96 of field effect transistor 98 connected to the output terminal 120 of amplifier 28 until such time as the vehicle operator removes his hand from the speed set switch 290 and conductive blade 298 comes out of contact with coast set terminal 294.

After the vehicle operator releases the conductive blade 296 so that it comes out of contact with the accelerate set terminal 292 of the speed set switch 290, or conductive blade 298 comes out of contact with set terminal 294, he will remove his foot from the accelerator pedal 408 or at least release this accelerator pedal to a slight extent thereby causing a decrease in the vehicle speed. This causes a reduction in the first signal which is proportional to vehicle speed appearing at the junction 82 of the frequency to voltage converter 14 and a decrease in the voltage appearing on the left hand side of the memory capacitor 88. This decrease in voltage is transmitted across this memory capacitor to the gate or control electrode 96 of the field effect transistor 98. This reduction in voltage in the gate or control electrode 96 of the field effect transistor 98 causes a large positive increase in voltage at the output terminal 120 of the amplifier 28 due to the gain and inversion characteristics of the amplifier 28. This large positive voltage is applied to the emitter of transistor 124 thereby driving it into a fully conducting state. Collector current from this transistor flows to ground through lead 128, resistor 130 and resistor 132 thereby switching transistors 136 and 140 into their fully conducting states and energizing the solenoid or winding 148 of the vacuum valve 458 and more fully energizing the solenoid winding 154 of the atmosphere valve 460.

Energization of the solenoid or winding 148 opens the vacuum valve 458 while the atmosphere valve 460 remains closed. Such action moves the diaphragm 428, shown in FIG. 3, to the right since the pressure in chamber 478 of the vacuum motor 32 will be decreased sharply. Movement of the diaphragm 428 to the right will cause chain 432 to tighten and will rotate the throttle plate or controller means 404 counterclockwise against the bias of spring 424. This action will cause the internal combustion engine 400 to operate at a higher rate of speed thereby driving the vehicle at a higher rate of speed.

Movement of the diaphragm 428 to the right will cause movement of the movable wiper arm 164 to the right, as shown in FIG. 3, and upwardly as shown in FIG. 2a, thereby causing an increase in the voltage applied to the junction 174 and the input terminal 108 of the amplifier 28, shown in FIG. 2a, via lead 166, diode 168, resistor 170 and lead 172.

It is desirable that no signal appear at the junction 174 from the movable wiper arm 164 of the variable resistor 162 at this wiper arm moves from the position that it is in when the system is not operating, i.e., as shown in FIG. 3, for the first one-fourth inch of this movement, i.e., as the wiper arm 164 moves to the right, as shown in FIG. 3, and moves upwardly as shown in FIG. 2a. This ¼-inch movement is necessary to take up the slack in the chain 432, and the diaphragm 428 and wiper arm 162 will move this far before any movement occurs in the throttle or controller means 404. With the proper values of resistors 51 and 162, this movement of one-fourth inch corresponds to approximately 0.3 to 0.4 of a volt and also corresponds to the forward voltage drop of diode 168. Thus, the positioning of the diode 168, in the circuit between the movable arm 164 of variable resistor 162 and the input junction 174 and input terminal 108 of amplifier 28, will assure that the junction 174 and the input terminal 108 do not receive any signal from the wiper arm 164 until movement in excess of this predetermined amount, for example, one-fourth inch, has occurred and until such time as the throttle or controller means 404 commence to open.

When the actual speed of the vehicle is equal to the command or set speed, the combined signals, appearing at the junction 174 from the movable wiper arm 164 and the output from the field effect transistor 98 applied to the junction 174 via resistor 106, will have a magnitude substantially equal to the voltage applied to the amplifier 28 from the line 52 via the lead 112. The characteristics of the amplifier 28 are such that the transistor 124 will be in conduction at a low level at this time by virtue of a low level current drive on the emitter thereof via the output terminal 120 of amplifier 28. This conduction of the transistor 124 is sufficient to maintain the transistor 140 in a conducting state and transistor 136 in a nonconducting state. As a result, the normally open atmosphere valve 460 is closed by virtue of having its solenoid or winding 154 energized and the normally closed vacuum valve 462 is also closed by virtue of the fact that its solenoid or winding 148 is not energized. The maintenance of transistor 140 in a conducting state and transistor 136 in a nonconducting state, when the above condition prevails, i.e., the speed of the vehicle is equal to the command speed, is brought about by virtue of diode 142 positioned in the emitter circuit of transistor 136 and the resistor 138 positioned in the base circuit of transistor 140.

Should the actual speed of the vehicle decrease below the command or set speed, the voltage appearing at the gate 96 of the field effect transistor 98 will decrease. This occurs because the first signal proportional to vehicle speed, appearing at the junction 82 and applied to the left hand side of the memory capacitor 88, decrease by virtue of this decrease in vehicle speed. This decrease is in turn transferred across the memory capacitor 88 to the gate 96 of the field effect transistor 98. This decrease in voltage will appear at the output of the field effect transistor 98 at the junction 100 and will be applied to the input terminal 108 of amplifier 28 via resistor 106 and junction 174. This decrease in voltage will appear as an amplified increase in voltage at the terminal 120 thereby driving transistor 124 to an increased conductive state.

When transistor 124 is driven into an increased conductive state, transistor 136 will be switched into a conductive state thereby opening the vacuum valve 458 by virtue of the energization of solenoid or winding 148. This action, as previously explained, will decrease the pressure in the chamber 478 of vacuum motor 32, move the diaphragm 428 to the right and increase the throttle setting of the vehicle internal combustion engine 400 thereby causing the actual speed of the vehicle to increase. This increase in vehicle speed causes an increase in the voltage appearing at the junction 82 of the frequency to voltage converter 14 and an increase in the voltage appearing at the left hand side of the memory capacitor 88. This increase in voltage is transmitted across capacitor 88 to the gate 96 of field effect transistor 98 where it appears as an increased voltage at the output thereof. This action also increases the voltage appearing at the wiper arm 164 of the variable resistor 162 thereby increasing the voltage appearing at junction 174 and the input terminal 108 of amplifier 28. This increase in voltage appears as a decrease in the voltage at the output 120 of the amplifier 28 and this decreases conduction of transistor 124 and decreases conduction of transistor 136 thereby decreasing the energization of vacuum valve solenoid 148. This action continues until a balance is reached and the actual speed of the vehicle is equal to the command speed.

On the other hand, if the actual speed of the vehicle increases, the voltage appearing at the junction 82 will increase thereby increasing the voltage appearing at the gate 96 of the field effect transistor 98 by virtue of the transference of this increased voltage across the memory capacitor 88. This increase in voltage at the gate 96 of the field effect transistor 98 is transferred to the input terminal 108 of the amplifier 28. The increase in voltage at this terminal 108 will be amplified and inverted to cause a large negative swing in voltage at the output terminal 120 and at the emitter of transistor 124 thereby driving it towards a fully nonconducting state. This action will drive transistor 140 to a nonconducting state thereby deenergizing the solenoid or winding 154 and opening the atmosphere valve 460 of vacuum motor 32. This action increases the pressure in chamber 478, and as a result, the diaphragm 428 will move to the left under the force of helical spring 494 thereby permitting the spring 424 to rotate the throttle or controller means 404 clockwise and towards a closed position. This action will reduce the speed of operation of the internal combustion engine 400 which will in turn decrease the actual speed of the automotive vehicle.

The reduction in the actual speed of the vehicle will appear as a reduced voltage at the junction 82 of the frequency to voltage converter 14 and this decrease in voltage will in turn appear at the gate 96 of the field effect transistor 98 by virtue of a transference across the memory capacitor 88. This decrease in voltage appearing at the gate 96 of the field effect transistor 98 will appear as an amplified positive swing at the output terminal 120 of amplifier 28. Also at this time, the output voltage appearing at the wiper 164 of the variable resistor 162 will be decreased and this decrease will be applied to the junction 174 of the amplifier 128. This decrease in voltage will further add to the increase in voltage at the output terminal 120. As a result, an increased voltage is applied to the emitter of transistor 124 thereby driving transistor 124 toward a more fully conducting state. Driving of transistor 124 toward its more fully conducting state switches transistor 140 back to its conducting state thereby reenergizing solenoid or winding 154 and closing atmosphere valve 460. When complete balance is achieved, i.e., the actual speed of the vehicle is equal to the command speed, the transistor 140 will be in a conducting state and will conduct sufficient current to close completely atmosphere valve 460 by virtue of full energization of the winding or solenoid 154.

If the vehicle operator wishes to change the speed of the vehicle at which he is operating to a new or increased speed, he depresses the speed set switch 290 so that the conductive blade 296 comes in contact with the accelerate set terminal 292. As previously explained, this action switches transistors 302 and 312 into their conducting states. As a result, the winding 316, connected to the collector circuit of transistor 312, will be energized thereby closing switch 320 and connecting the gate or control electrode 96 of the field effect transistor 98 to ground through lead 328, lead 330, lead 332, the collector-emitter circuit of constant current drain transistor 334, resistor 336 and resistor 132 and grounded line 62. This action decreases at a constant rate the voltage on the gate 96 of the field effect transistor 98 and the voltage on the right hand side of the memory capacitor 88 thereby decreasing the voltage at the junction 174 and at the input terminal 108 of the amplifier 28. This decrease in voltage increases the voltage appearing at the output 120 of the amplifier 28 thereby driving transistor 124 towards a more fully conducting state. This action, as previously explained, will switch transistor 136 into a conducting state thereby energizing winding or solenoid 148 of normally closed vacuum valve 458 and decreasing the pressure in the chamber 478 of the vacuum motor 32.

Decrease of the pressure in chamber 478 moves the diaphragm 428 to the right, as shown in FIG. 3, and through the chain 432 increases the throttle or controller 404 setting of the internal combustion engine 400.

When the speed desired by the vehicle operator is reached, he then removes his hand from the speed set switch 290 thereby disengaging the conductive blade 296 from the accelerate set terminal 292. This action switches transistor 312 to a nonconducting state and deenergizes the winding 136 thereby opening the switch 320 and trapping a new voltage across the memory capacitor 88 which corresponds to the new desired or set speed.

The use of the constant current drain transistor 334 causes, when the switch 320 is closed, a decrease at a constant rate of the voltage on the gate 96 of the field effect transistor 98. This action will cause a constant acceleration of the vehicle by virtue of a constant decrease in voltage appearing at the junction 100 in the output circuit of the field effect transistor 98. This decrease in voltage, when combined with the increase in voltage from the variable resistor 162, provides a constant rate of decrease in the pressure of chamber 478 of vacuum motor 32. As a result, the throttle or controller means 404 is opened at a constant rate thereby increasing the speed of the vehicle at a constant rate.

If the vehicle operator wishes to decrease the speed at which he is operating the automotive vehicle under the control of the speed control system of the present invention, he operates the speed set switch 290 so that the conductive blade 298 comes into engagement with the coast set terminal 294. This action, as previously explained with respect to the setting of the system into operation, switches transistors 302, 312 and 346 into their conducting states. Switching of transistor 312 into a conducting state energizes winding 316 thereby closing switch 320. Switching of transistor 346 into its conducting state energizes the solenoid or winding 182 through the emitter-collector circuit of transistor 346, lead 348, lead 350 and diode 352. This action closes switch 180 which connects the gate or control electrode 96 of the field effect transistor 98 to the output terminal 120 of amplifier 28 thereby reducing the gain of the two amplifiers 24 and 28 to zero. This action, of course, removes any voltage from the emitter of transistor 124 and deenergizes transistors 136 and 140 thereby deenergizing both windings 148 and 154 of vacuum valve 458 and atmosphere valve 460, respectively. As a result, the normally closed vacuum valve 458 is closed and the normally open atmosphere valve 460 is opened and the pressure in the chamber 478 of the vacuum motor 32 will increase rapidly thereby moving diaphragm 428 to the left and causing the controller or throttle 404 of the internal combustion engine 400 to rotate towards its closed position under the impetus of spring 424. This action rapidly decreases the speed of the automotive vehicle and decreases the actual speed signal appearing at junction 82 of the frequency to voltage converter 14.

When the desired lower speed is reached, the vehicle operator removes his hand from the speed set switch 290 so that the conductive blade 298 comes out of engagement with the coast set terminal 294. This action switches transistors 302, 312 and 346 back to their nonconductive states thereby deenergizing solenoid or winding 316 and solenoid or winding 182. As a result, both switches 320 and 180 open thereby trapping a new command speed signal across the memory capacitor 88 that is a function of the speed of the vehicle when the operator disengages the conductive blade 298 from the coast set terminal 294.

The application of the brakes of the automotive vehicle will disenable the speed control system of the present invention so that the vehicle is no longer under the control of the system. As previously explained, the application of the brakes will close the stop lamp switch 213, shown in FIG. 2. This action will connect the source of electrical energy B+ to the base of transistor 190 via closed stop lamp switch 213, lead 207, lead 208, diode 210, lead 199 and resistor 193. Application of a positive potential to the base of transistor 190 will switch it to a conducting state thereby permitting current flow out of the base of transistor 186 through transistor 190 and switching transistor 186 to a conducting state. This action energizes winding 182 that controls switch 180 thereby closing switch 180 and connecting the gate or control electrode 96 of the field effect transistor 98 to the output terminal 120 of the amplifier 28 thereby reducing the gain of this amplifier system to zero, cutting off conduction of transistor 124 and causing both transistors 136 and 140 to be switched to their nonconducting states.

Switching of transistor 190 to its conducting state also switches transistor 218 to its nonconducting state by virtue of the diversion of current from resistors 276, 278 and 280 connected to the base thereof through the collector-emitter circuit of transistor 190. Switching of transistor 218 to a nonconducting state deenergizes winding 216 thereby opening switch 160 and deenergizing the line 158 that supplies power to the solenoids or windings 148 and 154 of the vacuum valve 458 and atmosphere valve 460. As previously explained, this operation will restore atmospheric pressure in the chamber 478 of the vacuum motor 32 and will restore the control of the controller or throttle 404 to the vehicle operator through the action of the accelerator pedal 408.

In order to restore the operation of the vehicle to the control of the speed control system, it is necessary for the vehicle operator to actuate the speed set switch 290 to bring conductive blade 296 into contact with accelerate set terminal 292 or conductive blade 298 into contact with coast set terminal 294, as previously explained.

If at any time, the junction at 209 is open circuited, as may occur if the brake stop lamp switch 213 harness becomes disconnected so that application of the brakes would not apply a positive voltage to the base of transistor 190 when the stop lamp switch 213 is depressed or closed, the current that previously flowed from junction 202 in line 44 through resistor 204, lead 206, lead 207, junction 209 and stop lamp 211, will be diverted by virtue of this open circuit to the base of transistor 190 through lead 208, diode 210, lead 199 and resistor 193. The application of this current to the base of transistor 190 will switch it to a conducting state thereby switching transistor 186 and transistor 218 to conducting and nonconducting states, respectively. This action, as previously explained, will close switch 180 thus disenabling the system by virtue of the connection of the gate 96 of field effect transistor 98 to the output terminal 120 of the amplifier 28 and will also open switch 160 thereby disconnecting the windings or solenoids 148 and 154 of the normally closed vacuum valve 458 and the normally open atmosphere valve 460 from the source of electrical energy B+.

There is also provided in the speed control system of the present invention a redundant brake or large speed error inhibit which comes into operation to disenable the speed control system when the actual speed of the vehicle is at a predetermined level below the set or command speed, for example, 10 m.p.h. below the command or set speed. If the stop lamp switch 213 should fail so that when the vehicle operator presses on the brake, the stop lamp switch 213 does not close and the system is not switched to its inoperative state, as discussed above, by virtue of the closure of this switch, the operator will continue to press on the brake against the action of the speed control system thereby decreasing substantially the actual speed of the vehicle. This action decreases the first signal which is proportional to the actual speed of the vehicle appearing at the junction 82 of the frequency to voltage converter thereby decreasing the voltage appearing at the left hand side of the memory capacitor 88 and this decrease in voltage appears at the gate or control electrode 96 of the field effect transistor 98. Decrease of the voltage appearing at the gate or control electrode 96 decreases the voltage appearing at the junction 100 thereby decreasing current through resistors 102 and 104. This action decreases the voltage appearing on line 366 that is connected to the emitter of transistor 360. On the other hand, the base voltage of this transistor is maintained constant by virtue of the connection of resistors 362 and 364 to the regulated voltage on line 52 and the grounded line 62.

When the speed of the vehicle falls to this predetermined level below the command or set speed, for example, 10 m.p.h. below the command or set speed, the voltage on the emitter of transistor 360 will fall sufficiently to switch transistor 360 to a conducting state. This action will divert the current previously flowing into the base of transistor 270 to ground through leads 372, 370, 368, the collector-emitter circuit of transistor 360, lead 366 and resistor 104 thereby switching transistor 270 to a nonconducting state and switching transistor 228 to a nonconducting state. This action deenergizes line 226 thereby cutting off current flow from this line through leads 224, 222 and 220 into winding 216 and the electrodes of transistor 218. As a result, transistor 218 is switched to a nonconducting state thereby deenergizing winding 216.

Deenergization of winding 216 opens switch 160 thereby cutting off power to the solenoids or windings 148 and 154 of the normally closed vacuum valve 458 and the normally open atmosphere valve 460, respectively. Deenergization of line 158 also permits current flow out of the base of transistor 186 through resistors 198, 201 and lead 203 to ground thereby switching this transistor to a conducting state and energizing the winding 182. Energization of the winding 182, as previously explained, closes switch 180 thereby connecting the gate or control electrode 96 of field effect transistor 98 to the output terminal 120 of amplifier 28. It can be readily appreciated that the above described action disables the speed control system of the present invention.

The diode 341 and resistor 343 connected to the stationary terminal of switch 320 through lead 328 and to the output terminal 120 of amplifier 28 through lead 176 provides a means for proper operation of the speed control system of the present invention when the vehicle operator employs the accelerator pedal 408 to override the speed control system of the present invention and accelerates to a speed substantially greater than his set or command speed. If the vehicle operator does this and then wishes to operate at this greatly increased speed, he will push the conductive blade 296 of the speed set switch 290 into contact with the accelerate set terminal 292 thereby switching transistor 312 into a conducting state and closing switch 320 by virtue of the energization of winding 316.

At this time, the output of the frequency to voltage converter 14 will be increased substantially over that which prevailed when the operator was operating the vehicle at the set or command speed and this increased voltage will be applied to the gate 96 of the field effect transistor 98 across memory capacitor 88. This increase in voltage at the gate 96 of field effect transistor 98 will appear as a large swing in negative voltage at the output terminal of amplifier 28. The diode 341 and the resistor 343, therefore, provide a low impedance path for current flow out of the gate 96 of the field effect transistor to the output terminal 120 of amplifier 28, and this path is in parallel with the path provided by the constant current drain transistor 334. Thus, the speed control system of the present invention can be set to operate at this substantially higher speed by virtue of the quick or rapid change in voltage on the gate 96 of field effect transistor 98 through diode 341 and resistor 343. Therefore, when the vehicle operator releases the conductive blade 296 of the speed set switch 290 from accelerate set terminal 292, the vehicle speed control system of the present invention will have reached equilibrium conditions so that it will control the vehicle speed at this new and much higher speed.

The diodes 340 and 341 are a matched pair so that the reverse leakage current through them is substantially equal. Thus, any leakage current through diode 341 will not increase the current through constant current transistor 334 when switch 320 is closed, but will flow in a reverse direction through diode 340. As a result, constant current out of gate or control electrode 96 of field effect transistor 98 and a constant reduction of voltage on this electrode is assured when switch 320 is closed thereby assuring acceleration of the vehicle at a constant rate.

I claim:

1. In a speed control system for an automotive vehicle, propulsive means, throttle means coupled to said propulsive means, actuating means coupled to said throttle means for controlling the position of said throttle means, means for generating a first signal having a magnitude proportional to vehicle speed, amplifying means having a high input impedance terminal, a capacitor connected in series with said last mentioned means and said high input impedance terminal, feedback means coupled to sense the position of said actuating means and said throttle means for producing a signal having a magnitude that is a function of the position of said throttle means, said amplifying means having a second input terminal connected to said feedback means and an output terminal coupled to said actuating means, circuit means including a switch conductively coupling the output terminal of said amplifying means to the high input impedance terminal of said amplifying means, means coupling said switch and the ignition switch of the vehicle for closing said switch when the ignition switch is closed, a set speed switch adapted to be actuated by the vehicle operator, and means coupling said set speed switch and said switch for opening said switch when said set speed switch is actuated whereby a command speed signal is set across said capacitor and said amplifying means is enabled to combine said first signal, and said command speed signal and said feedback signal and to supply an actuating signal to said actuating means.

2. The combination of claim 1 and comprising further a braking system for said automotive vehicle including a brake pedal and an electrical stop lamp switch circuit, electrical circuit means coupling said switch and said electrical stop lamp circuit for closing said switch when said brake pedal is depressed.

3. The combination of claim 1 and comprising further a low speed inhibit means coupled to said means for generating said first signal and to said means coupling said set speed switch and said switch for preventing the opening of said switch upon actuation of set speed switch when said first signal is below a predetermined magnitude.

4. The combination of claim 1 and further comprising means coupled to said switch and to said amplifying means for sensing a large speed error signal having a magnitude which is a function of command speed signal and said first signal and for opening said switch when the magnitude of said low speed inhibit signal is at a predetermined level corresponding to a predetermined difference between the command speed and the actual speed of the vehicle.

5. The combination of claim 1 in which a coupling means having a predetermined amount of lost motion connects said actuating means to said throttle means, and said feedback means is coupled to said actuating means and a unilateral conducting element is connected in series with said feedback means and said second input terminal of said amplifying means and is poled to permit current flow from said feedback means to said second input terminal, said unilateral conducting means having a predetermined forward voltage drop substantially equal to the voltage produced by said feedback means when said lost motion is taken up.

6. The combination of claim 1 further comprising a switch means adapted to be actuated by the vehicle operator for reducing the speed of the vehicle and for setting a new and lower command speed signal across said capacitor, and circuit means coupling said switch means and said switch coupling the output terminal of said amplifying means and said high input impedance terminal of said amplifying means for closing said switch when said switch means is closed by the vehicle operator and for opening said switch when said switch means is opened by the vehicle operator.

7. The combination of claim 1 in which said means coupling said set speed switch and said switch coupling the output terminal of said amplifying means to the high input impedance terminal of said amplifying means comprises a first solid state switching device having output electrodes and a control electrode, an electromagnetic means for closing said switch when energized, said electromagnetic means being connected to the output electrodes of said solid state switching device, and circuit means coupled to said output electrodes, said control electrode and the ignition switch for energizing said electromagnetic means when the ignition switch is closed.

8. The combination of claim 7 in which said means coupling said set speed switch and said switch coupling the output terminal of said amplifying means to the high input impedance terminal of said amplifying means further comprise a second solid state switching device having an output circuit and a control electrode, circuit means coupling the output circuit of said second solid state switching device with the control electrode of said first solid state switching device and the output circuit of said first solid state switching device with the control electrode of said second solid state switching device for rendering said first solid state switching device conducting whenever said second solid state switching device is conducting and for rendering said first solid state switching device nonconducting when said second solid state switching device is nonconducting.

9. The combination of claim 8 further comprising a low speed inhibit means coupled to the control electrode of said second solid state switching device and to said means for generating a first signal having a magnitude proportional to vehicle speed for applying a control signal on the control electrode of said second solid state switching means to maintain said second solid state switching means in a conductive state irrespective of any other control signals applied to said control electrode when the magnitude of said first signal is below a predetermined level.

10. The combination of claim 9 further comprising a stop lamp, a stop lamp switch adapted to be closed and supply electrical energy to said stop lamp when the brakes of the automotive vehicle are applied, and means coupled to said stop lamp switch and said control electrode of said second solid state switching device for rendering said second solid state switching device conducting when said stop lamp switch is closed whereby said first solid state switching device is rendered conducting, said electromagnetic means is energized and said switch connecting said output terminal of said amplifying means to the high input impedance terminal of said amplifying means is closed.

11. The combination of claim 1 further comprising circuit means including a normally open switch connecting said high input impedance terminal of said amplifying means to a reference potential and circuit means coupled to said normally open switch and said set speed switch for closing said normally open switch when said set speed switch is closed and for opening said normally open switch when said set speed switch is opened.

12. The combination of claim 11 in which said first mentioned circuit means includes a constant current conducting means connected in series with said normally open switch.

13. The combination of claim 12 in which said constant current conducting means comprises a transistor having an emitter-collector circuit connected in series with said normally closed switch and a diode connected across said emitter-collector circuit.

14. The combination of claim 1 further comprising means for increasing the speed of the vehicle and for setting a newer and higher command speed signal across said capacitor, said means comprising a normally open switch connected to the high input impedance terminal of said amplifying means and to a source of reference potential, and means coupled to said set speed switch for closing said normally open switch when said set speed switch is closed and for opening said normally open switch when said set speed switch is opened.

15. The combination of claim 14 in which a constant current conducting means is connected to said normally open switch and said reference potential whereby the voltage on said high input impedance terminal of said amplifying means is changed at a constant rate when said normally open switch is closed.

16. A speed control system for an automotive vehicle having an internal combustion engine comprising controller means coupled to the internal combustion engine for controlling the power output of the engine, means for producing a first electrical signal corresponding to the actual speed of the vehicle, a memory means comprising a capacitor and a high input impedance amplifying means having a control electrode and an output terminal, one of the terminals of said capacitor connected to said means for producing the first electrical signal and the other terminal of said capacitor connected to the control electrode of said high input impedance amplifier, a circuit including a switch connected to said output terminal and said control electrode, a source of electrical energy, an ignition switch connected to said source of electrical energy and to the ignition system of the internal combustion engine, and circuit means coupled to said ignition switch and to said switch for closing said switch when said ignition switch is closed.

17. The combination of claim 16 including electrically controlled power actuator means coupled to said controller means for controlling the position of said controller means, circuit means coupled to the output terminal of said amplifying means and said electrically controlled power actuator, said speed control system including a switching means coupled to said switch connected to said output terminal and said control electrode for opening said switch when said switching means is actuated whereby a voltage is set across said capacitor which is a function of the speed of the vehicle at the moment said switch is opened.

18. The combination of claim 17 further comprising circuit means including a normally open switch and a constant current means connected to said control electrode of said high input impedance amplifying means and to a reference potential, and circuit means coupled to said normally open switch and to said switching means for closing said normally open switch when said switching means is actuated whereby the potential on said control electrode is changed at a substantially constant rate.

19. The combination of claim 18 in which said constant current means comprises a transistor having an emitter-collector circuit connected in series with said normally open switch and said reference potential and a base, means connected to said base for applying a base bias on said base.

20. The combination of claim 18 further comprising a low impedance circuit means connected to the output terminal of said amplifying means and to said normally open switch for providing a current path from said control electrode of said high input impedance amplifying means to said output terminal when said normally open switch is closed.

21. The combination of claim 20 in which said circuit means comprises a series circuit of a diode and a resistor, said diode being poled to permit current flow from said control electrode to said output terminal.

22. The combination of claim 17 further comprising circuit means including a normally open switch connected to said control electrode of said high input impedance amplifying means and to a low reference potential, and circuit means coupled to said switching means and said normally open switch for closing said normally open switch when said switching means is actuated.

23. The combination of claim 22 in which said switching means includes an accelerate terminal and a coast terminal, and movable means adapted to contact either said accelerate terminal or said coast terminal, said movable means being connected to said last mentioned circuit means.

24. The combination of claim 23 further comprising circuit means coupled to said accelerate terminal and said switch connected to the output terminal and the control electrode of said high input impedance amplifying means for opening said switch when said movable means comes into engagement with said accelerate terminal.

25 The combination of claim 23 further comprising circuit means coupled to said coast terminal and said switch connected to the output terminal and the control electrode of said high input impedance amplifying means for closing said switch when said movable means comes into electrical contact with said coast terminal and for opening said switch when said movable means subsequently comes out of electrical contact with said coast terminal.

26. The combination of claim 23 in which said circuit means connected to said control electrode of said high input impedance amplifying means and said low reference potential further comprises a constant current means connected in series with said normally open switch.

27. The combination of claim 26 in which said constant current means comprises a transistor having an emitter-collector circuit connected in series with said normally open switch and said reference potential and a base, means connected to said base for applying a base bias on said base.

28. In a speed control system for an automotive vehicle, propulsive means, throttle means coupled to said propulsive means, electrically controlled actuating means, a connector having lost motion therein coupling said throttle means and said actuating means, means for generating a first signal having a magnitude proportional to vehicle speed, means for producing a second signal which is a function of the desired speed of the vehicle, feedback means coupled to said actuating means for producing a feedback signal having magnitude that is a function of the position of said actuating means, means coupled to receive said first signal, said second signal and said feedback signal for producing an actuating signal, means for applying said actuating signal to said actuating means, and means coupled in circuit with said feedback means and said means for producing said actuating signal for preventing the application of said feedback signal to said means for producing said actuating signal until said actuator takes up the lost motion in said connector.

29. The combination of claim 28 in which said means comprises a diode poled to permit current flow from said feedback means to said means for producing said actuating signal.

30. The combination of claim 29 in which said diode has a forward voltage drop substantially equal to the voltage of said feedback signal when said actuating means has taken up the lost motion in said connector.

* * * * *